United States Patent [19]

Ford, Jr.

[11] 3,760,032

[45] Sept. 18, 1973

[54] UNSATURATED ESTERS, POLYESTERS, AND CROSS-LINKED POLYESTERS

[75] Inventor: Ernest C. Ford, Jr., Newark, Del.

[73] Assignee: ICI America, Inc., Wilmington, Del.

[22] Filed: Aug. 5, 1970

[21] Appl. No.: 61,170

[52] U.S. Cl. ............................ 260/869, 260/75 UA
[51] Int. Cl. ............................................ C08f 21/02
[58] Field of Search ............... 260/861, 869, 78.4 E, 260/47 UP, 47 R, 485 L, 86.7

[56] References Cited
UNITED STATES PATENTS

| 3,149,087 | 9/1964 | Anagnostopoulos et al. ...... 260/31.6 |
| 2,726,177 | 12/1955 | Lew ............................... 117/161 |
| 2,765,224 | 10/1956 | Lambrech ........................ 71/2.6 |
| 2,902,518 | 9/1959 | Hardis et al. ..................... 260/613 |
| 3,151,183 | 9/1964 | Bill et al. ........................ 260/869 |
| 3,274,293 | 9/1966 | Elfers et al. ..................... 260/869 |
| 3,162,615 | 12/1964 | Bremmer ......................... 260/47 |
| 2,634,251 | 4/1953 | Kass .............................. 260/863 X |
| 2,855,379 | 10/1958 | Heinen ........................... 260/861 |
| 3,214,491 | 10/1965 | Stanton .......................... 260/871 |
| 3,464,852 | 9/1969 | Caldwell et al. ................. 117/138.8 |
| 3,524,902 | 8/1970 | Feltzin et al. .................... 260/835 |

FOREIGN PATENTS OR APPLICATIONS

| 836,530 | 6/1960 | Great Britain |
| 687,696 | 6/1964 | Canada |
| 1,567,721 | 5/1969 | France |

OTHER PUBLICATIONS

Chem. Abstracts 61, 12152a (1964).

Primary Examiner—William H. Short
Assistant Examiner—Earl A. Nielsen
Attorney—Kenneth E. Mulford and Roger R. Horton

[57] ABSTRACT

Novel unsaturated esters and polyesters terminated with alkoxylated phenols and novel cross-linked polyesters formed by reacting these esters and polyesters with a styrene compound. The halogenated cross-linked polyesters are flame retardant.

6 Claims, No Drawings

UNSATURATED ESTERS, POLYESTERS, AND CROSS-LINKED POLYESTERS

This invention relates to novel unsaturated esters and polyesters and to cross-linked polyesters made therefrom.

The novel esters and polyesters of this invention are prepared by condensing stoichiometric proportions of an ethylenically unsaturated dibasic acid, its anhydride, or mixtures thereof, a diol (optional), and an alkoxylated phenol which may be substituted. For every two molar proportions of phenol entering the reaction, there are from one to 30 molar proportions of acid or anhydride, and, as required by stoichiometry, from zero to 29 molar proportions of diol; preferably, there are two to 10 molar proportions of acid or anhydride for every two molar proportions of phenol for higher bromine content in the brominated polyesters. In practice, if the diol employed is volatile, more than the stoichiometric amount may be charged to the reactor to compensate for the amount lost during esterification. If no diol is employed, the resulting product is the monomeric di(phenoxyalkyl) ester of te dibasic acid, but the preferred products are polyesters obtained by employing a diol in the range of molar proportions recited above.

Examples of suitable ethylenically unsaturated dibasic acids include fumaric acid and itaconic acid; maleic anhydride is an example of a suitable ethylenically unsaturated monoanhydride. Fumaric acid and maleic anhydride are preferred because of their good performance, ready availability, and economy. Although not preferred, up to about 75 mol % of the ethylenically unsaturated dibasic acid or its anhydride may be replaced by a dibasic acid or its anhydride free of ethylenic unsaturation such as phthalic acid, phthalic anhydride, isophthalic acid, succinic acid, or succinic anhydride.

Examples of suitable diols include ethylene glycol, propylene glycol, dipropylene glycol, neopentyl glycol, dibromoneopentyl glycol, diethylene glycol, ethoxylated aniline, trimethyl pentane diol, dipropoxylated Bisphenol A, and diethoxylated Bisphenol A; dipropylene glycol, neopentyl glycol, and dipropoxylated Bisphenol A are preferred because they have a high ratio of carbon to oxygen which enhances the compatibility of the resulting polyesters with styrene.

The phenol may be substituted with chlorine, bromine, or methyl, preferably bromine since bromine gives superior flame retardancy properties to the polyester. Up to an average of two atoms of halogen or methyl may be present per benzene ring; more substitution tends to make the polyester incompatible with styrene. Examples include unsubstituted phenol, cresols, and xylenols; dibromophenol is preferred since it has a maximum bromine content and good compatibility with styrene. The phenol is then alkoxylated with about 1 mol to about 3 mols ethylene oxide or propylene oxide per mol of phenol.

The polyesters may be prepared by mixing approximately stoichiometric proportions of the unsaturated dibasic acid or anhydride, the diol if present, and the alkoxylated phenol together with a polymerization inhibitor such as about 0.05 to 0.5 percent hydroquinone; a slight excess of diol may be used to compensate for volatility losses during esterification. The mixture is heated and stirred and an inert gas such as nitrogen or carbon dioxide is bubbled through the mixture to exclude oxygen during the reaction cycle. The polyesters may also be prepared by prereacting the dibasic acid or anhydride with the diol followed by reaction with the alkoxylated phenol. Generally, the product will be a mixture of esters having various values of $n$ in the general formula. The acid number of the polyesters of this invention is about five to 40; acid numbers below five are difficult to obtain and above 40 the polyester has poor strength properties.

The cross-linked polyesters of this invention are formed by cross-linking the polyesters of this invention with a styrene compound such as styrene, divinyl benzene, or methyl styrene, and chlorinated derivatives thereof; styrene and chlorostyrene are preferred since styrene is inexpensive and chlorostyrene adds to the halogen content of the polyester. The proportion of polyester to styrene compound may vary from about one to about three to about three to about one; below 25 percent styrene the polyester is too soft and has poor strength and above 75 percent styrene the polyester is too brittle.

It is preferable to include a second ethylenically unsaturated polyester during the cross-linking with the styrene compound to increase the hardness of the resulting cross-linked polyester. Examples of such second polyesters include the maleic acid polyester of propylene glycol and the fumaric acid polyester of diethylene glycol. If a second unsaturated polyester is included, the cross-linked polyesters preferably comprise about 20 to about 60 percent (by weight) polyester of this invention, about 20 to about 60 percent styrene compound, and about 20 to about 50 percent second ethylenically unsaturated polyester. If an ester of this invention is used, an unsaturated polyester is usually employed in order to enhance the physical properties. The cross-linking reaction is catalyzed with a source of free radicals such as a peroxide, for example, benzoyl peroxide or methyl ethyl ketone peroxide, following known procedure for polyester cure. The cross-linked polyesters can be used in a manner similar to commercial polyesters in the manufacture of reinforced plastics. The halogenated, cross-linked polyesters are flame retardant and will not support combustion; other halogenated compounds or antimony oxide may be added during polymerization to enhance their flame-retardant properties.

The following examples will further illustrate my invention; in all the examples, 22 mm. vacuum was applied the last two hours of reaction to remove water.

EXAMPLE 1

801 g. (2.6 mols) 1.1 prodendro (i.e., alkoxylated with 1.1 mols propylene oxide per mol of phenol) dibromophenol and 151 g. (1.3 mols) fumaric acid were reacted in the presence of 0.1 g. hydroquinone for 2 hours at 180° C. and 5 ½ hours at 200° C. The resulting product was a viscous liquid which analyzed AN (acid number) = 21, SAP (saponification number) = 164, OH (hydroxyl number) = 26, and percent Br = 46, Yield 897 g.

EXAMPLE 2

900 g. (3 mols) 1.1 dendro (i.e., alkoxylated with 1.1 mols ethylene oxide per mol of phenol) dibromophenol and 174 g. (1.5 mols) fumaric acid were reacted in the presence of 0.2 g. hydroquinone for 4 hours at 180° C. and 1 ½ hours at 200° C. The resulting product was a viscous liquid which analyzed AN = 18, SAP = 166, OH = 26, and percent Br = 47, Yield 1,015 g.

EXAMPLE 3

493 g. (1.6 mols) 1.1 prodendro dibromophenol, 135 g. (1.78 mols) propylene glycol, and 278 g. (2.4 mols) fumaric acid were reacted in the presence of 0.35 g. hydroquinone for 3 hours at 160° C., 3 hours at 175° C., and 7 hours at 200° C. The resulting product was a viscous liquid which analyzed AN = 13, SAP = 333, OH = 29, and percent Br = 30, Yield 804 g.

EXAMPLE 4

720 g. (2.4 mols) 1.1 dendro dibromophenol, 624 g. (2.4 mols) dibromoneopentyl glycol, and 418 g. (3.6 mols) fumaric acid were reacted in the presence of 0.18 g. hydroquinone for 1 hour at 160° C., 2 hours at 170° C., 2 hours at 180° C., and 4 hours at 200° C., 22 mm. vacuum being applied for the last two hours of reaction. The final product was a viscous liquid which analyzed AN = 20, SAP = 364, OH = 47, and percent Br = 46.4, Yield 1,620 g.

EXAMPLE 5

418 g. (1.39 mols) 1.1 dendro dibromophenol, 283 g. (1.393 mols), 2.5 dendro aniline, and 242 g. (2.09 mols) fumaric acid were reacted in the presence of 0.45 g. hydroquinone for 1 hour at 160° C., 2 hours at 175° C. and 5 hours at 200° C., 22 mm. vacuum being applied the last 2 hours of reaction. The final product, a solid resin, analyzed AN = 16, SAP = 268, OH = 41, and percent Br = 26.5, Yield 866 g.

EXAMPLE 6

960 g. (3.2 mols) 1.1 dendro dibromophenol, 270 g. (3.55 mols) propylene glycol, and 556 g. (4.79 mols) fumaric acid were reacted in the presence of 0.8 g. hydroquinone for 3 hours at 160° C., 3 hours at 175° C., and 5 hours at 200° C., 22 mm. vacuum being applied the last 2 hours of reaction. The resulting product was a viscous liquid which analyzed AN = 15, SAP = 322, OH = 37, and percent Br = 31, Yield 1,608 g.

EXAMPLE 7

1,105 g. (3.15 mols) 2.2 prodendro Bisphenol A, 832 g. (2.7 mols) 1.1 prodendro dibromophenol, and 522 g. (4.5 mols) fumaric acid were reacted in the presence of 0.16 g. hydroquinone for 3 hours at 180° C. and 10 hours at 200° C., 24 mm. vacuum being applied the last 2 hours of reaction. The resulting product was a solid (M. pt. °C 63 B&R) which analyzed AN = 23, SAP = 214, OH = 30, and percent Br = 19, Yield 2,298 g.

EXAMPLE 8

2,880 g. (9.14 mols) 1.1 prodendro dibromophenol, 762 g. (10 mols) propylene glycol, and 1590 g. (13.7 mols) fumaric acid were reacted in the presence of 2.5 g. hydroquinone for 3 hours at 160° C., 3 hours at 175° C., and 7 hours at 200° C., 22 mm. vacuum being applied the last 2 hours of reaction. The resulting product was a viscous liquid which analyzed AN = 15, SAP = 322, OH = 29, and percent Br = 31, Yield 4,701 g.

EXAMPLE 9

1,291 g. (4.1 mols) 1.1 prodendro dibromophenol, 447 g. (4.3 mols) neopentyl glycol, and 714 g. (6.15 mols) fumaric acid were reacted in the presence of 1.2 g. hydroquinone for 3 hours at 160° C., 2 hours at 180° C., and 6 hours at 200° C., 22 mm. vacuum being applied the last 2 hours of reaction. The resulting product was a viscous liquid which analyzed AN = 17, SAP = 314, OH = 29, and percent Br = 30, Yield 2,226 g.

EXAMPLE 10

485 g. (1.54 mols) 1.1 prodendro dibromophenol, 236 g. (1.62 mols) trimethyl pentane diol, and 268 g. (2.31 mols) fumaric acid were reacted in the presence of 0.18 g. hydroquinone for 1 hour at 160° C., 5 hours at 180° C., and 6 hours at 200° C., 22 mm. vacuum being applied the last 2 hours of reaction. The resulting product was a viscous liquid which analyzed AN = 23, SAP = 288, OH = 17, and percent Br = 28.6, Yield 886 g.

EXAMPLE 11

288 g. (2.0 mols) 1.1 dendro phenol, 130 g. (2.1 mols) ethylene glycol, and 348 g. (3.0 mols) fumaric acid were reacted in the presence of 0.38 g. hydroquinone for 10 hours at a top temperature of 200° C. Vacuum was then applied (28 mm.) for 1 hour. The final product, a viscous amber resin, analyzed AN = 16, SAP = 517, and OH = 44, Yield 647 g. A 50 percent styrene solution of this polyester on cooling to room temperature became pasty due to the crystallinity of the polyester.

EXAMPLE 12

288 g. (2.0 mols) 1.1 dendro phenol, 219 g. (2.1 mols) neopentyl glycol, and 348 g. (3.0 mols) fumaric acid were reacted in the presence of 0.38 g. hydroquinone for 10 hours at a top temperature of 200° C. Vacuum was then applied (28 mm.) for 1 hour. The final product, a viscous amber resin, analyzed AN = 17, SAP = 461, and OH = 39, Yield 737 g. A 50 percent styrene solution of this polyester on cooling to room temperature became pasty due to the crystallinity of the polyester.

EXAMPLE 13

288 g. (2.0 mols) 1.1 dendro phenol, 160 g. (2.1 mols) propylene glycol, and 348 g. (3.0 mols) fumaric acid were reacted in the presence of 0.35 g. hydroquinone for 14 hours at a top temperature of 200° C. Vacuum was then applied (28 mm.) for 1 hour. The final product, a viscous amber resin, analyzed AN = 16, SAP = 495, and OH = 42, Yield 6,819 g. A 50 percent styrene solution of this polyester on cooling to room temperature became pasty on standing.

EXAMPLE 14

288 g. (2.0 mols) 1.1 dendro phenol, 130 g. (2.1 mols) ethylene glycol, 148 g. (1.0 mol) phthalic anhydride, and 232 g. (2.0 mols) fumaric acid were reacted in the presence of 0.35 g. hydroquinone for 11 hours at a top temperature of 200° C. Vacuum was then applied (28 mm.) for 1 hour. The final product, a viscous amber resin, analyzed AN = 26, SAP = 484, and OH = 40, Yield 706 g. A 50 percent styrene solution of this polyester on cooling to room temperature became pasty on standing.

EXAMPLE 15

316 g. (2.0 mols) 1.1 prodendro phenol, 130 g. (2.1 mols) ethylene glycol, and 348 g. (3.0 mols) fumaric acid were reacted in the presence of 0.34 g. hydroquinone for 12 hours at a top temperature of 200° C. Vacuum was then applied (28 mm.) for 1 hour. The final product, a viscous amber resin, analyzed AN = 24, SAP = 508, and OH = 30, Yield 672 g. A 50 percent styrene solution of this polyester on cooling to room temperature became pasty on standing.

EXAMPLE 16

991 g. (2.8 mols) 2.2 prodendro Bisphenol A and 406 g. (3.5 mols) fumaric acid were reacted in the presence of 0.32 g. hydroquinone for 5 hours at a top temperature of 210° C. The acid number was found to be 75. 248 g. (147) mols) 1.1 prodendro o-cresol were then added and the reaction continued at 210° C. until an acid number of 30 was obtained. Vacuum was then applied (28 mm.) for 1 hour. The final product, a solid resin, had a melting point °C. (Ball and Ring) of 72 and analyzed AN = 19, SAP = 253, and OH = 32, Yield 1,508 g.

EXAMPLE 17

1,118 g. (3.15 mols) 2.2 prodendro Bisphenol A and 406 g. (3.5 mols) fumaric acid were reacted in the presence of 0.32 g. hydroquinone for 3.5 hours at a top temperature of 210°C. The acid number was found to be 54. 124 g. (0.74 mols) 1.1 prodendro o-cresol were then added and the reaction continued until an acid number of 30 was obtained. Vacuum was then applied (28 mm.) for 1 hour. The final product, a solid resin, had a melting point °C. (B&R) of 86 and analyzed AN = 16, SAP = 252, and OH = 31, Yield 1,514 g.

EXAMPLE 18

1,178 g. (3.32 mols) 2.2 prodendro Bisphenol A and 406 g. (3.5 mols) fumaric acid were reacted in the presence of 0.32 g. hydroquinone for 5.5 hours at a top temperature of 210° C. The acid number was found to be 35. 62 g. (0.37 mols) 1.1 prodendro o-cresol were then added and the reaction continued until an acid number of 30 was obtained. Vacuum was then applied (28 mm.) for 1 hour. The final product, a solid resin, had a melting °C. (B&R) of 96 and analyzed AN = 16, SAP = 253, and OH = 30, Yield 1,518 g.

EXAMPLE 19

1,118 g. (3.15 mols) 2.2 prodendro Bisphenol A, 406 g. (3.5 mols) fumaric acid, and 124 g. (0.74 mols) 1.1 prodendro o-cresol were reacted in the presence of 0.32 g. hydroquinone for 7 hours at a top temperature of 210° C. The acid number at this point was 32. Vacuum was then applied (28 mm.) and held for 2 hours. The final product, a solid resin, had a melting point ° C. (B&R) of 86 and analyzed AN = 15, SAP = 255, and OH = 49, Yield 1,511 g.

The halogenated cross-linked polyesters are useful components of flame retardant polyester systems as shown below. A casting was prepared by mixing the ingredients on a roll mill until the polyester was in solution. Cure of castings was readily effected by use of 1.0 percent benzoyl peroxide and 0.4 percent dimethyl aniline catalyst system for 18 hours at room temperature followed by post-cure of 4 hours at 100° C. The following Tables give the ingredients (in parts by weight) and the properties of various compositions:

TABLE I

| Composition | A | B | C |
| --- | --- | --- | --- |
| ATLAC G-382* | 20 | 20 | 10 |
| Styrene |  | 20 | 20 |
| O-Chlorostyrene | 40 | 20 | 20 |
| Polyester of Exam. 6 | 40 | 40 | 50 |
| % Halogen | 23 | 18 | 21 |
| Viscosity (c.p.s.) | 590 | 240 | 70 |
| Gel Time (min.) | 25 | 26 | 22 |
| Barcol Hardness | 49–51 | 46–50 | 45–50 |
| ASTM 635 | NB** | NB** | NB** |
| HLT-15 | 80 | 90 | 90 |

*Trademark polyester of 2,2-di(4 hydroxy propoxy phenyl) propane. See U.S. Pat. No. 2,634,251.
**Non-burning

TABLE II

| Compositions | D | E | F | G | H |
| --- | --- | --- | --- | --- | --- |
| PARAPLEX P-43* | 40 | 40 | 30 | 20 | 20 |
| O-Chlorostyrene | 20 | 10 |  |  |  |
| Styrene |  | 10 | 20 | 20 | 20 |
| AROCHLOR 5460** | 20 | 20 | 20 | 20 |  |
| Polyester of Exam. 8 | 20 | 20 | 30 | 60 | 80 |
| % Halogen | 23 | 21 | 21 | 31 | 25 |
| Viscosity (c.p.s.) | 760 | 420 | 210 | 460 | 760 |
| Gel Time (min.) | 20 | 20 | 15–20 | 15 | 9 |
| Barcol Hardness | 50 | 45–59 | 50 | 44–47 | 45–50 |
| ASTM 635 (flame retardancy) | NB | NB | NB | NB | NB |
| HLT-15 (flame retardancy) |  |  |  |  | 100 |

*Trademark of Rohm and Haas Co. for a general purpose unsaturated polyester.
**Trademark of Monsanto Co. for chlorinated biphenyl containing 60% chlorine.

TABLE III

| Compositions | I | J | K | L |
| --- | --- | --- | --- | --- |
| Styrene | 30 | 15 |  |  |
| O-Chlorostyrene |  |  | 20 | 20 |
| AROCHLOR 5460 | 20 | 15 | 10 | 20 |
| Polyester of Exam. 7 | 50 | 50 |  |  |
| Polyester of Exam. 10 |  |  | 70 | 60 |
| % Halogen | 21 | 23 | 27 | 28 |
| Viscosity (c.p.s.) | 360 | 340 | 450 | 320 |
| Gel Time (min.) | 15 | 12 | 9 | 12 |
| Barcol Hardness | 38–40 | 45 | 45 | 42 |
| ASTM 635 | NB | NB | NB | NB |
| HLT-15 | 64 | 80 | 72 | 100 |

The polyesters described in Examples 16–18 are of particular interest in that they demonstrate that the terminated polyesters of this invention have excellent physical properties when compared to an unterminated polyester made from the same acid and diol. Following are data obtained on their evaluation:

TABLE IV

|  | Example 16 | Example 17 | Example 18 | ATLAC G-382 Control |
| --- | --- | --- | --- | --- |
| Molar Proportion |  |  |  |  |
| Acid | 5.0 | 5.0 | 5.0 | 5.0 |
| Diol | 4.0 | 4.5 | 4.75 | 5.0 |
| 1.1 dendro o-cresol | 2.0 | 1.0 | 0.5 | 0 |
| AN | 19 | 16 | 16 | 18 |
| SAP | 253 | 252 | 253 | 248 |
| OH | 32 | 31 | 30 | 35 |
| M. pt. °C. (B&R) | 72 | 85 | 96 | 100 |
| Visc. (50% in Styrene c.p.) | 50 | 110 | 210 | 500 |

The above resins were cross-linked with 50 percent styrene (50 percent of total), 1 percent benzoyl peroxide, and 0.2 percent dimethyl aniline. The cross-linked polyesters were cured at room temperature followed by 4 hours at 100° C. The following casting properties were observed:

TABLE V

| | Example 16 | Example 17 | Example 18 | ATLAC G-382 Control |
|---|---|---|---|---|
| Flex Strength (p.s.i.) | 15,000 | 14,200 | 14,100 | 17,900 |
| Flex Modulus × $10^6$ | 0.40 | 0.38 | 0.38 | 0.45 |
| Heat Distortion Temp. °C. | 109 | 113 | 116 | 120 |
| Barcol Hardness | 29.33 | 34.37 | 33.36 | 36.39 |
| Tensile Strength | 4300 | 4500 | 4600 | 8800 |
| Tensile Modulus × $10^6$ | 0.21 | 0.20 | 0.20 | 0.42 |
| % Elongation | 3.34 | 4.40 | 4.08 | 2.75 |

What is claimed is:

1. A composition comprising
   a. a condensation reaction product of
      i. from 2 to 10 mols of an ethylenically unsaturated dicarboxylic acid, its anhydride or mixtures thereof,
      ii. a diol selected from the group consisting of propylene glycol, dipropylene glycol, neopentyl glycol and dipropoxylated Bisphenol A, and
      iii. 2 mols of an alkoxylated dibromophenol wherein said alkoxylated dibromophenol is alkoxylated with from 1 to 3 mols of ethylene oxide or propylene oxide per mol of dibromophenol and wherein the number of mols of the diol is one less than the number of mols of the acid and anhydride; copolymerized with
   b. a styrene compound selected from the group consisting of styrene and chlorostyrene.

2. A composition as claimed in claim 1, where the ratio of the condensation reaction product to the styrene compound is about one to about three to about three to about one.

3. A composition as claimed in claim 1, wherein the ethylenically unsaturated dicarboxylic acid is fumaric acid.

4. A composition as claimed in claim 1, wherein the anhydride is maleic anhydride.

5. A composition as claimed in claim 1 wherein up to about 75 mol percent of the ethylenically unsaturated dicarboxylic acid, its anhydride, or mixtures thereof is replaced by a dicarboxylic acid or its anhydride free of ethylenic unsaturation and selected from the group consisting of phthalic acid, phthalic anhydride, isophthalic acid, succinic acid, or succinic anhydride.

6. A composition as claimed in claim 1 comprising about 20 to about 60 percent the condensation reaction product, about 20 to about 60 percent styrene compound, and about 20 to about 50 percent of an ethylenically unsaturated polyester.

* * * * *

PO-1050
(5/69)

UNITED STATES PATENT OFFICE
CERTIFICATE OF CORRECTION

Patent No. 3,760,032                Dated  Sept. 18, 1973

Inventor(s)  Ernest C. Ford, Jr.

It is certified that error appears in the above-identified patent and that said Letters Patent are hereby corrected as shown below:

Column 1, line 23, "te" should read --the--.

Column 5, line 15, "(147)mols)" should read  -- 1.47 mols) --

Column 6, line 13, "*Trademark" should read --*Trademark of Atlas Chemical Industries, Inc., for fumaric acid--

Column 6, line 59, "85" should read --86--.

Signed and sealed this 3rd day of December 1974.

(SEAL)
Attest:

McCOY M. GIBSON JR.                 C. MARSHALL DANN
Attesting Officer                   Commissioner of Patents